US011377543B2

(12) United States Patent
Lummerstorfer et al.

(10) Patent No.: US 11,377,543 B2
(45) Date of Patent: Jul. 5, 2022

(54) POLYPROPYLENE COMPOSITION WITH EXCELLENT SURFACE APPEARANCE

(71) Applicant: BOREALIS AG, Vienna (AT)

(72) Inventors: Thomas Lummerstorfer, Linz (AT); Daniela Mileva, Linz (AT); Georg Grestenberger, Linz (AT)

(73) Assignee: BOREALIS AG, Vienna (AT)

( * ) Notice: Subject to any disclaimer, the term of this patent is extended or adjusted under 35 U.S.C. 154(b) by 369 days.

(21) Appl. No.: 16/620,321

(22) PCT Filed: Jun. 21, 2018

(86) PCT No.: PCT/EP2018/066547
§ 371 (c)(1),
(2) Date: Dec. 6, 2019

(87) PCT Pub. No.: WO2019/002078
PCT Pub. Date: Jan. 3, 2019

(65) Prior Publication Data
US 2020/0123361 A1 Apr. 23, 2020

(30) Foreign Application Priority Data

Jun. 26, 2017 (EP) ..................................... 17177842
Mar. 2, 2018 (EP) ..................................... 18159755

(51) Int. Cl.
*C08L 23/12* (2006.01)
*C08K 5/098* (2006.01)
*C08K 5/14* (2006.01)
*C08L 23/08* (2006.01)
*C08L 23/30* (2006.01)

(52) U.S. Cl.
CPC .............. *C08L 23/12* (2013.01); *C08K 5/098* (2013.01); *C08K 5/14* (2013.01); *C08L 23/0815* (2013.01); *C08L 23/30* (2013.01); *C08L 2203/30* (2013.01); *C08L 2205/02* (2013.01); *C08L 2205/03* (2013.01); *C08L 2207/02* (2013.01); *C08L 2310/00* (2013.01); *C08L 2312/00* (2013.01)

(58) Field of Classification Search
CPC .. C08L 23/12; C08L 23/0815; C08L 2207/02; C08L 2312/00; C08K 5/14; C08K 5/098
See application file for complete search history.

(56) References Cited

U.S. PATENT DOCUMENTS

| | | | |
|---|---|---|---|
| 5,272,236 A | 12/1993 | Lai et al. | |
| 2002/0082328 A1 | 6/2002 | Yu et al. | |
| 2010/0267900 A1* | 10/2010 | Gahleitner | C08L 23/10 |
| | | | 525/209 |

FOREIGN PATENT DOCUMENTS

| | | |
|---|---|---|
| EP | 586390 B1 | 5/1997 |
| EP | 0591224 B1 | 2/1998 |
| EP | 0887380 B1 | 2/2004 |
| EP | 0887379 B1 | 12/2004 |
| EP | 0491566 B2 | 3/2005 |
| EP | 0887381 B1 | 11/2005 |
| EP | 0991684 B1 | 1/2006 |
| JP | 61192752 A | 8/1986 |
| JP | 7-138428 A | 5/1995 |
| JP | 2004520455 A | 7/2004 |
| JP | 2011195706 A | 10/2011 |
| JP | 2012214733 A | 11/2012 |
| JP | 2016501972 A | 1/2016 |
| WO | 87/07620 A1 | 12/1987 |
| WO | 92/12182 A1 | 7/1992 |
| WO | 92/19653 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 2004/000899 | 12/2003 |
| WO | 2004/111095 A1 | 12/2004 |
| WO | 2007/147687 A1 | 12/2007 |
| WO | 2010/149529 A1 | 12/2010 |
| WO | 2012000884 A1 | 1/2012 |
| WO | 2012000885 A1 | 1/2012 |
| WO | 2014/100802 A1 | 6/2014 |

OTHER PUBLICATIONS

Applicant: Borealis AG; Chinese Application No. 201880038190.2; "Polypropylene Composition with Excellent Surface Appearance"; Chinese Office Action dated Oct. 13, 2021; 10 pgs.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
H.N.Cheng, "13C NMR Analysis of Ethylene-Propylene Rubbers", Macromolecules 1984, 17, 1950-1955.
Castignolles, et al. "Detection and quantification of branching in polyacrylates by size-exclusion chromatography (SEC) and melt-state 13C NMR spectroscopy", (2009), pp. 2373-2383.
Resconi et al., "Selectivity in Propene Polymerization with Metallocene Catalysts", Chem. Rev. 2000, 100, pp. 1253-1345.
Klimke, et al., "Optimisation and Application of Polyolefin Branch Quantification by Melt-State 13C NMR Spectroscopy", Macromol. Chem. Phys. 2006, pp. 382-395.
Parkinson, et al., "Effect of Branch Length on 13C NMR Relaxation Properties in Molten Poly[ethylene-co-(a-olefin)] Model Systems", 2007, pp. 21828-22133.

(Continued)

*Primary Examiner* — Mark S Kaucher
(74) *Attorney, Agent, or Firm* — Tarolli, Sundheim, Covell & Tummino LLP

(57) ABSTRACT

The present invention is directed to a heterophasic polypropylene composition (HC) comprising a modified polypropylene composition (mPP), a process for preparing said heterophasic polypropylene composition (HC) and an article comprising said heterophasic polypropylene composition (HC). The present invention is further directed to the use of a composition comprising a peroxide (PO) and a crosslinking agent (CA) to reduce tigerskin of a polypropylene composition (PP).

14 Claims, No Drawings

(56) References Cited

OTHER PUBLICATIONS

Singh et al., "Triad sequence determination of ethylene-propylene copolymers—application of quantitative 13C NMR", Polymer Testing 28 (2009) pp. 475-479.

Wang et al., "Structural Analysis of Ethylene/Propylene Copolymers Synthesized with a Constrained Geometry Catalyst", Macromolecules 2000, 33, pp. 1157-1162.

Zhou et al., "A new decoupling method for accurate quantification of polyethylene copolymer composition and triad sequence distribution with 13C NMR", Journal of Magnetic Resonance 187 (2007) pp. 225-233.

Zweifel, et al., "Plastics Additives Handbook", 5th Edition, Department of Materials, Institute of Polymers, 2001.

Frank, et al., "GS-VIII : OP18 New Measurement Method for Appearance of Flow Marks or Tiger Stripes Defect for Improved Quantification and Analysis", pp. 25, Mar. 15, 2009.

Griffin, et al., "Low-load rotor-synchronised Hahn-echo pulse train (RS-HEPT) 1H decoupling in solid-state NMR: factors affecting MAS spin-echo dephasing times", Oct. 16, 2007, pp. S198-S208.

Filip, et al., "Heteronuclear decoupling under fast MAS by a rotor-synchronized Hahn-echo pulse train", Journal of Magnetic Resonance, (2005), pp. 239-243.

Extended European Search Report for Application No. 17177842.6-1302, dated Oct. 9, 2017.

Zweifel, et al., "Plastics Additives Handbook", 6th Edition, Department of Materials, Institute of Polymers, 2009, pp. 1141-1190.

Kakugo, et al., "13C NMR Determination of Monomer Sequence Distribution in Ethylene-Propylene Copolymers Prepared with δ-TiC13-Al( C2H5%) Cl", Macromolecules 1982,15, 1150-1152.

Pollard, et al., "Observation of Chain Branching in Polyethylene in the Solid State and Melt via 13C NMR Spectroscopy and Melt NMR Relaxation Time Measurements", Macromolecules 2004, pp. 813-825.

James C. Randall, "A Review of High Resolution Liquid 13Carbon Nuclear Magnetic Resonance Characterizations of Ethylene-Based Polymers", C29 201, 1989.

Japanese Office Action for Japanese Patent Application No. 2019-566765 dated Feb. 2, 2021; 3 Pgs.

\* cited by examiner

POLYPROPYLENE COMPOSITION WITH EXCELLENT SURFACE APPEARANCE

The present invention is directed to a heterophasic polypropylene composition (HC) comprising a modified polypropylene composition (mPP), a process for preparing said heterophasic polypropylene composition (HC) and an article comprising said heterophasic polypropylene composition (HC). The present invention is further directed to the use of a composition comprising a peroxide (PO) and a crosslinking agent (CA) to reduce tigerskin of a polypropylene composition (PP).

Good surface appearance of injection moulded parts is a basic prerequisite for many visible and unpainted automotive applications. In this regard, especially flow mark formation is deteriorating the visual perception of such parts in many cases and numerous efforts have been undertaken to avoid the appearance of flow marks during processing.

One approach to reduce flow mark formation in automotive exterior compounds is based on the use of peroxides during melt-compounding and results in excellent surface appearance even under very severe processing conditions. However, said improved surface appearance is often accompanied by decreased tensile properties and impact strength. Especially the latter is a drawback since good impact performance is essential for many demanding automotive applications.

Accordingly, there is a need in the art for a polypropylene composition applicable for the preparation of injection moulded parts without the appearance of flow marks while the impact performance remains on a high level.

Therefore, it is an object of the present invention to provide a polypropylene composition showing a reduced amount of flow marks and a high impact strength after injection moulding.

The finding of the present invention is that a heterophasic system treated with a peroxide and a crosslinking agent is featured by an excellent surface appearance and impact performance after injection moulding.

Accordingly, the present invention is directed to a heterophasic polypropylene composition (HC) comprising a modified polypropylene composition (mPP), wherein said modified polypropylene composition (mPP) is obtained by treatment of a polypropylene composition (PP) with a peroxide (PO) and a crosslinking agent (CA), said polypropylene composition (PP) comprising
i) a propylene polymer (PP1), and
ii) a plastomer (PL) being a copolymer of ethylene and at least one C4 to C20 α-olefin,
wherein
said heterophasic polypropylene composition (HC) has a ratio XCS/XHU in the range of 0.6 to 2.6, wherein XCS is the xylene cold soluble content [in wt.-%] of the heterophasic polypropylene composition (HC) and XHU is the xylene hot insoluble content [in wt.-%] of the heterophasic polypropylene composition (HC),
and wherein
the weight ratio of the propylene polymer (PP1) and the plastomer (PL) [w(PP1)/w(PL)] in the modified polypropylene composition (mPP) is above 1.0, wherein w(PP1) is the overall amount of the propylene polymer (PP1) (in wt.-%) within the modified polypropylene composition (mPP) and w(PL) is the overall amount of the plastomer (PL) (in wt.-%) within the modified polypropylene composition (mPP).

According to one embodiment of the present invention, the heterophasic polypropylene composition (HC) has a xylene hot insoluble content (XHU) in the range of 11.0 to 25.0 wt.-%.

According to another embodiment of the present invention, the heterophasic polypropylene composition (HC) has a xylene cold soluble content (XCS) determined according ISO 16152 equal or below 29.0 wt.-%.

It is especially preferred that the heterophasic polypropylene composition (HC) has a melt flow rate $MFR_2$ (230° C., 2.16 kg) determined according to ISO 1133 of at least 10.0 g/10 min.

According to one embodiment of the present invention, the weight ratio of the propylene polymer (PP1) and the plastomer (PL) [w(PP1)/w(PL)] in the modified polypropylene composition (mPP) is above 1.0, more preferably from above 1.0 to 3.0, still more preferably from 1.1 to 1.8, yet more preferably from 1.1 to 1.4, like from 1.1 to 1.2.

According to one embodiment of the present invention, the polypropylene composition (PP) comprises
i) at least 10.0 wt.-%, more preferably 20.0 to 80.0 wt.-%, still more preferably 30.0 to 70.0 wt.-%, yet more preferably 45.0 to 65 wt.-%, like 55.0 to 62.0 wt.-% of the propylene polymer (PP1), and
ii) at least 5.0 wt.-%, more preferably 10.0 to 70.0 wt.-%, still more preferably 20.0 to 60.0 wt.-%, yet more preferably 35.0 to 55.0 wt.-%, like 38.0 to 42.0 wt.-%, of the plastomer (PL),
based on the overall amount of the polypropylene composition (PP).

According to another embodiment of the present invention, the propylene polymer (PP1)
i) is a propylene homopolymer (H-PP1), and/or
ii) has a melt flow rate $MFR_2$ (230° C., 2.16 kg) determined according to ISO 1133 equal or below 35.0 g/10 min.

It is especially preferred that the propylene polymer (PP1) has
i) a first polypropylene fraction (PP1a) having a melt flow rate $MFR_2$ (230° C., 2.16 kg) determined according to ISO 1133 in the range of 5.0 to 20.0 g/10 min and
ii) a second polypropylene fraction (PP1b) having a melt flow rate $MFR_2$ (230° C., 2.16 kg) determined according to ISO 1133 in the range of 30.0 to 65.0 g/10 min.

According to still another embodiment of the present invention, the plastomer (PL) is a copolymer of ethylene and 1-butene or 1-octene.

It is especially preferred that the plastomer (PL) has
(a) a melt flow rate MFR (190° C., 2.16 kg) measured according to ISO 1133 below 30 g/10 min,
(b) a comonomer content, based on the total weight of the plastomer (PL), in the range of 8.0 to 35.0 mol-%, and
(c) a density below 0.880 g/cm$^3$.

According to one embodiment of the present invention, the peroxide (PO) is an alkyl or aryl peroxide, preferably 2,5-dimethyl-2,5-di-(tert-butylperoxy)hexane.

According to another embodiment of the present invention, the crosslinking agent is a compound of formula (I)

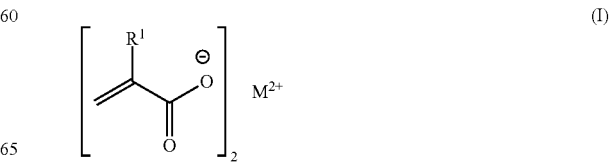

wherein $M^{2+}$ is a divalent metal ion and $R^1$ is hydrogen or methyl.

The present invention is further directed to an article, preferably moulded article, comprising the heterophasic polypropylene composition (HC) as described above.

The present invention is also directed to the use of a composition comprising a peroxide (PO) and a crosslinking agent (CA) to reduce tigerskin of a polypropylene composition (PP), wherein a heterophasic polypropylene composition (HC) as described above is obtained.

It is preferred that the reduction of tigerskin is accomplished in case of MSE values equal or below 10.

The present invention is also directed to a process for the preparation of the heterophasic composition (HC) as described above, wherein the polypropylene composition (PP) comprising the propylene polymer (PP1), the plastomer (PL) and optionally the propylene homopolymer (H-PP) is extruded in an extruder in the presence of the peroxide (PO) and the crosslinker (CA).

In the following, the present invention is described in more detail.

The Heterophasic Polypropylene Composition (HC)

The heterophasic polypropylene composition (HC) according to the present invention comprises a modified polypropylene composition (mPP). Said modified polypropylene composition (mPP) is obtained by treating a polypropylene composition (PP) with a peroxide (PO) and a crosslinking agent (CA). Said polypropylene composition (PP) comprises a propylene polymer (PP1) and a plastomer (PL).

The heterophasic polypropylene composition (HC) of the present invention must comprise the modified polypropylene composition (mPP). In addition the composition may comprise alpha nucleating agents (NU), inorganic fillers (F) and additives (AD). Accordingly, it is preferred that the modified polypropylene composition (mPP) makes up at least 80 wt.-%, more preferably at least 85 wt.-%, still more preferably at least 90 wt.-%, like at least 95 wt.-% of the heterophasic polypropylene composition (HC). In one specific embodiment the heterophasic polypropylene composition (HC) consists of the modified polypropylene composition (mPP) and the optional alpha nucleating agents (NU), inorganic fillers (F) and/or additives (AD).

As outlined above, the modified polypropylene composition (mPP) is obtained by treatment of the polypropylene composition (PP) with a peroxide (PO) and a crosslinking agent (CA). Preferred peroxides (PO) and crosslinking agents (CA) are listed below under the section "modified polypropylene composition (mPP)".

The peroxide (PO) is preferably introduced in the form of a master batch. That is the peroxide (PO) is pre-mixed with a polymeric carrier material. Said polymeric carrier material does not contribute to the improved properties of the heterophasic polypropylene composition (HC). Preferably the polymeric carrier material is a polyethylene or a polypropylene, the latter being preferred. Typically the polymeric carrier material is different to the propylene polymer (PP1) and the plastomer (PL). Preferably the polymeric carrier material is a propylene homopolymer having a lower melt flow rate than the propylene polymer (PP1). The amount of said polymeric carrier material is preferably in the range of 1 to 15 wt.-%, more preferably in the range of 2 to 12 wt.-%, based on the based on the total weight of the heterophasic polypropylene composition (HC).

Thus the heterophasic polypropylene composition (HC) preferably comprises (a) 85 to 99 wt.-%, more preferably 90 to 98 wt.-%, still more preferably 95 to 97 wt.-%, like 48 to 61 wt.-%, based on the total weight of the heterophasic polypropylene composition (HC), of the modified polypropylene composition (mPP), and (b) 1 to 15 wt.-%, more preferably in the range of 2 to 12 wt.-%, still more preferably in the range of 3 to 10, like in the range of 5 to 9 wt.-%, based on the total weight of the heterophasic polypropylene composition (HC), of the polymeric carrier material of the peroxide (PO).

The crosslinking agent (CA) is preferably introduced in the form of a master batch as well. That is the crosslinking agent is pre-mixed with a polymeric carrier material. Said polymeric carrier material does not contribute to the improved properties of the heterophasic polypropylene composition (HC). Preferably the polymeric carrier material is a polyethylene or a polypropylene, the latter being preferred. Typically the polymeric carrier material is different to propylene polymer (PP1) and the plastomer (PL). Preferably the polymeric carrier material is a propylene homopolymer having a lower melt flow rate than the propylene polymer (PP1). The amount of said polymeric carrier material is preferably in the range of 1 to 15 wt.-%, more preferably in the range of 2 to 12 wt.-%, based on the based on the total weight of the heterophasic polypropylene composition (HC).

Accordingly, the heterophasic polypropylene composition (HC) preferably comprises (a) 85 to 99 wt.-%, more preferably 90 to 98 wt.-%, still more preferably 95 to 97 wt.-%, like 48 to 61 wt.-%, based on the total weight of the heterophasic polypropylene composition (HC), of the modified polypropylene composition (mPP), (b) 1 to 15 wt.-%, more preferably in the range of 2 to 12 wt.-%, still more preferably in the range of 3 to 10, like in the range of 5 to 9 wt.-%, based on the based on the total weight of the heterophasic polypropylene composition (HC), of the polymeric carrier material of the peroxide (PO), and (c) 1 to 15 wt.-%, more preferably in the range of 2 to 12 wt.-%, still more preferably in the range of 3 to 10, like in the range of 5 to 9 wt.-%, based on the based on the total weight of the heterophasic polypropylene composition (HC), of the polymeric carrier material of the crosslinking agent (CA).

As mentioned above the heterophasic polypropylene composition (HC) may comprise in addition alpha-nucleating agents (NU), inorganic fillers (F) and/or additives (AD). According to this invention, the alpha nucleating agent (NU) nor the filler (F) is an additive (AD). Further, according to this invention the filler (F) is not an alpha nucleating agent (NU). Accordingly it is preferred that the heterophasic polypropylene composition (HC) contains up to 5.0 wt.-%, preferably $1.0 \times 10^{-5}$ to 4.0 wt.-%, more preferably $2.0 \times 10^{-5}$ to 2.0 wt.-%, based on the total weight of the heterophasic polypropylene composition (HC), of alpha nucleating agents (NU), up to 30.0 wt.-%, more preferably up to 20.0 wt.-%, still more preferably up to 15 wt.-%, based on the total weight of the heterophasic polypropylene composition (HC), of inorganic fillers (F), and/or up to 8.0 wt.-%, preferably 0.1 to 6.0 wt.-%, more preferably 0.5 to 4.0 wt.-%, based on the total weight of the heterophasic polypropylene composition (HC), of additives (AD). The alpha-nucleating agents (NU), inorganic fillers (F) and additives (AD) are described in more detail below.

Accordingly, the heterophasic polypropylene composition (HC) preferably comprises, more preferably consists of (a) 85 to 99 wt.-%, more preferably 90 to 98 wt.-%, still more preferably 95 to 97 wt.-%, like 48 to 61 wt.-%, based on the total weight of the heterophasic polypropylene composition (HC), of the modified polypropylene composition (mPP), (b) 1 to 15 wt.-%, more preferably in the range of 2 to 12 wt.-%, still more preferably in the range of 3 to 10, like in the range of 5 to 9 wt.-%, based on the based on the total weight of the heterophasic polypropylene composition (HC), of the polymeric carrier material of the peroxide (PO), (c) 1 to 15 wt.-%, more preferably in the range of 2 to 12 wt.-%, still more preferably in the range of 3 to 10, like in the range of 5 to 9 wt.-%, based on the based on the total weight of the heterophasic polypropylene composition (HC), of the polymeric carrier material of the crosslinking agent (CA), (d) up to 5.0 wt.-%, preferably $1.0 \times 10^{-5}$ to 4.0 wt.-%, more preferably $2.0 \times 10^{-5}$ to 2.0 wt.-%, based on the total weight of the heterophasic polypropylene composition (HC), of alpha nucleating agents (NU), (e) up to 30.0 wt.-%, more preferably up to 20.0 wt.-%, still more preferably up to 15 wt.-%, based on the total weight of the heterophasic polypropylene composition (HC), of inorganic fillers (F), and (f) up to 8.0 wt.-%, preferably 0.1 to 6.0 wt.-%, more preferably 0.5 to 4.0 wt.-%, based on the total weight of the heterophasic polypropylene composition (HC), of additives (AD).

It is preferred that the heterophasic polypropylene composition (HC) according to the present invention has a melt flow rate MFR (230° C., 2.16 kg) determined according to ISO 1133 of at least 10.0 g/10 min, more preferably in the range of 10.0 to 30.0 g/10 min, still more preferably in the range of 10.0 to 20 g/10 min, like in the range of 10.0 to 15.0 g/10 min.

The heterophasic polypropylene composition (HC) has a ratio XCS/XHU in the range of 0.6 to 2.6, more preferably in the range of 0.8 to 1.8, still more preferably in the range of 0.9 to 1.7, like in the range of 1.0 to 1.5, wherein XCS is the xylene cold soluble content [in wt.-%] of the heterophasic polypropylene composition (HC) and XHU is the xylene hot insoluble content [in wt.-%] of the heterophasic polypropylene composition (HC).

Preferably, the heterophasic polypropylene composition (HC) has a xylene hot insoluble content (XHU) in the range of 11.0 to 25.0 wt.-%, more preferably in the range of 12.0 to 22.0 wt.-%, still more preferably in the range of 15.0 to 20.0 wt.-%, like in the range of 17.0 to 20.0 wt.-%.

Additionally or alternatively to the previous paragraph, it is preferred that the heterophasic polypropylene composition (HC) has a xylene cold soluble content (XCS) determined according ISO 16152 equal or below 29.0 wt.-%, more preferably in the range of 15.0 to 28.0 wt.-%, still more preferably in the range of 18.0 to 25 wt.-%, like in the range of 19.0 to 23.0 wt.-%.

It is especially preferred that the heterophasic polypropylene composition (HC) has a ratio IV(XCS)/IV(XCI) of at least 1.63, more preferably at least 1.70, still more preferably at least 1.85, like in the range of 1.85 to 2.5, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

Further, it is preferred that the intrinsic viscosity IV determined according to DIN ISO 1628/1 (in Decalin at 135° C.) of the xylene cold soluble fraction XCS of the heterophasic polypropylene composition (HC) is below 2.0 dl/g, more preferably below 1.7 dl/g, still more preferably below 1.5 dl/g.

Additionally, it is preferred that the intrinsic viscosity IV determined according to DIN ISO 1628/1 (in Decalin at 135° C.) of the xylene insoluble fraction XCI of the heterophasic polypropylene composition (HC) is below 1.5 dl/g, more preferably below 1.0 dl/g, still more preferably below 0.8 dl/g.

Preferably, the inventive heterophasic polypropylene composition (HC) is featured by a rather high impact strength. Accordingly, it is preferred that the heterophasic polypropylene composition (HC) has a Charpy notched impact strength determined according to ISO 179/1eA at 23° C. of at least 20.0 kJ/m$^2$, more preferably at least 30.0 kJ/m$^2$, still more preferably at least 50.0 kJ/m$^2$, like in the range of 50.0 to 100.0 kJ/m$^2$.

Additionally or alternatively to the previous paragraph, it is preferred that the heterophasic polypropylene composition (HC) has a flexural modulus determined according to ISO 178 above 500 MPa, more preferably in the range of 500 to 1000 MPa, still more preferably in the range of 600 to 800 MPa.

The modified polypropylene composition (mPP)

As outlined above, the heterophasic polypropylene composition (HC) comprises a modified polypropylene composition (mPP) obtained by treatment of a polypropylene composition (PP) with a peroxide (PO) and a crosslinking agent (CA).

Said modified polypropylene composition (mPP) must comprise the propylene polymer (PP1) and the plastomer (PL). In a preferred embodiment the propylene polymer (PP1) and the plastomer (PL) make up together at least 80 wt.-%, more preferably at least 85 wt.-%, still more preferably at least 90 wt.-%, like at least 95 wt.-% of the modified polypropylene composition (mPP). In one specific embodiment the modified polypropylene composition (mPP) consists of the propylene polymer (PP1) and the plastomer (PL).

The polymeric carrier material of the peroxide (PO), the polymeric carrier material of the crosslinking agent (CA), the alpha nucleating agents (NU) and the additives (AD) are not considered to be part of the modified polypropylene composition (mPP) but of the final heterophasic polypropylene composition (HC).

The weight ratio of the propylene polymer (PP1) and the plastomer (PL) [w(PP1)/w(PL)] in the modified polypropylene composition (mPP) is above 1.0, more preferably from above 1.0 to 3.0, still more preferably from 1.1 to 1.8, yet more preferably from 1.1 to 1.4, like from 1.1 to 1.2, wherein w(PP1) is the overall amount of the propylene polymer (PP1) (in wt.-%) within the modified polypropylene composition (mPP) and w(PL) is the overall amount of the plastomer (PL) (in wt.-%) within the modified polypropylene composition (mPP).

Additionally or alternatively to the previous paragraph, it is preferred that the modified polypropylene composition (mPP) comprises at least 10.0 wt.-%, more preferably 20.0 to 80.0 wt.-%, still more preferably 30.0 to 70.0 wt.-%, yet more preferably 45.0 to 65 wt.-%, like 55.0 to 62.0 wt.-%, of the propylene polymer (PP1), and at least 5.0 wt.-%, more preferably 10.0 to 70.0 wt.-%, still more preferably 20.0 to 60.0 wt.-%, yet more preferably 35.0 to 55.0 wt.-%, like 38.0 to 42.0 wt.-% of the plastomer (PL), based on the overall weight of the modified polypropylene composition (mPP).

As can be taken from the wording "modified" the polypropylene composition (mPP) is a composition, i.e. the polypropylene composition (PP), which has been chemically treated by the use of a peroxide (PO) and a crosslinking agent (CA). In the present case the modified polypropylene composition (mPP) is the polypropylene composition (PP) which has been chemically modified due to either partial cross-linking of individual polymer chains, branching of individual chains or development of favourable dispersed phase morphology by changing the viscosity ratios between the dispersed phase and the matrix of the polymer composition. The decrease of the xylene cold soluble content (XCS) accompanied by an increase of the xylene hot insoluble content (XHU) caused by the addition of peroxide and crosslinking agent can serve as an evidence for a change in the macromolecular level of the system.

As mentioned above to obtain the modified polypropylene composition (mPP) the polypropylene composition (PP) must be treated with a peroxide (PO) and a crosslinking agent (CA).

Like the modified polypropylene composition (mPP), also the polypropylene composition (PP) must comprise the propylene polymer (PP1) and the plastomer (PL). In a preferred embodiment the propylene polymer (PP1) and the plastomer (PL) make up together at least 80 wt.-%, more preferably at least 85 wt.-%, still more preferably at least 90 wt.-%, like at least 95 wt.-% of the polypropylene composition (PP). In one specific embodiment the polypropylene composition (PP) consists of the propylene polymer (PP1) and the plastomer (PL).

Preferably, the polypropylene composition (PP) comprises at least 10.0 wt.-%, more preferably 20.0 to 80.0 wt.-%, still more preferably 30.0 to 70.0 wt.-%, yet more preferably 45.0 to 65 wt.-%, like 55.0 to 62.0 wt.-% of the propylene polymer (PP1), and at least 5.0 wt.-%, more preferably 10.0 to 70.0 wt.-%, still more preferably 20.0 to 60.0 wt.-%, yet more preferably 35.0 to 55.0 wt.-%, like 38.0 to 42.0 wt.-%, of the plastomer (PL), based on the overall amount of the polypropylene composition (PP).

Preferably, the polypropylene composition (PP) is a heterophasic system comprising a crystalline matrix being the propylene polymer (PP1) and a dispersed phase being the plastomer (PL). Accordingly, the propylene polymer (PP1) is preferably a (semi)crystalline propylene polymer (PP1) and the plastomer (PL) is an elastomeric polymer and the plastomer (PL) is (finely) dispersed in the (semi)crystalline propylene polymer (PP1). In other words the (semi)crystalline propylene polymer (PP1) constitutes a matrix in which the plastomer (PL) forms inclusions in the matrix, i.e. in the (semi)crystalline propylene polymer (PP1). Thus the matrix contains (finely) dispersed inclusions being not part of the matrix and said inclusions contain the plastomer (PL). The term "inclusion" according to this invention shall preferably indicate that the matrix and the inclusion form different phases within the polypropylene composition (PP), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

It is preferred that the modified polypropylene composition (mPP) has a melt flow rate MFR (230° C., 2.16 kg) measured according to ISO 1133 above 9.0 g/10 min, more preferably in the range of 9.0 to 30 g/10 min, still more preferably in the range of 10.0 to 25.0 g/10 min, like in the range of 10.0 to 15.0 g/10 min.

Further, it is preferred that the intrinsic viscosity IV determined according to DIN ISO 1628/1 (in Decalin at 135° C.) of the xylene cold soluble fraction XCS of the modified polypropylene composition (mPP) is below 2.0 dl/g, more preferably below 1.7 dl/g, still more preferably below 1.5 dug.

Additionally, it is preferred that the intrinsic viscosity IV determined according to DIN ISO 1628/1 (in Decalin at 135° C.) of the xylene insoluble fraction XCI of the modified polypropylene composition (mPP) is below 1.5 dl/g, more preferably below 1.0 dug, still more preferably below 0.8 dug.

It is especially preferred that the ratio IV(XCS)/IV(XCI) of the modified polypropylene composition (mPP) is at least 1.63, more preferably at least 1.70, still more preferably at least 1.90, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

The individual properties of the propylene polymer (PP1) and the plastomer (PL) in the polypropylene composition (PP) can be taken from the information below.

The peroxide (PO) for the modification of the polypropylene composition (PP) is preferably thermally decomposing free radical-forming agents. More preferably the peroxide (PO), i.e. the thermally decomposing free radical-forming agent, is selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.
Alkyl peroxides: allyl t-butyl peroxide, 2,2-bis(t-butylperoxybutane), 2,5-dimethyl-2,5-di-(tert-butylperoxy)hexane, 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.
Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate, or mixtures of these above listed free radical-forming agents.

In a preferred embodiment, the peroxide (PO) is an alkyl peroxide. It is especially preferred that the peroxide (PO) is 2,5-dimethyl-2,5-di-(tert-butylperoxy)hexane.

The crosslinking agent (CA) for the modification of the polypropylene composition (PP) is preferably a compound having at least two groups suitable for crosslinking. Accordingly, the crosslinking agent (CA) is preferably a compound comprising at least two ethylenically unsaturated functional groups. Non-limiting examples for suitable crosslinking agents (CA) are N,N'-methylenebisacrylamide, N,N'-methylenebismethacrylamide, ethylene glycol divinyl ether, triethylene glycol divinyl ether, cylcohexanediol divinyl ether, triallyl amine and/or tetra allyl ammonium salts, tetraallyloxyethane, pentaerythrittriallylether, divinyl benzene, triallyl isocyanurate, ethylene diamine, diethylene triamine, 1,4-butanediol diacrylate, 1,4-butanediol dimethacrylate, 1,3-butyleneglycol diacrylate, 1,3-butyleneglycol dimethacrylate, diethyleneglycol diacrylate, diethyleneglycol dimethacrylate, ethyleneglycol dimethacrylate, ethoxylated bisphenol-A-diacrylate, ethoxylated bisphenol-A-dimethacrylate, 1,6-hexanediol diacrylate, 1,6-hexanediol dimethacrylate, neopentylglycol dimethacrylate, polyethyleneglycol diacrylate, polyethyleneglycol dimethacrylate, triethyleneglycol diacrylate, tetraethyleneglycol dimethacrylate, dipentaerythritpentaacrylate, pentaerythrittetraacrylate, pentaerythrittriacrylate, trimethylolpropane triacrylate, trimethylolpropane trimethacrylate, cyclopentadiene diacrylate, tris(2-hydroxyethyl) isocyanurate triacrylate and/or tris(2-hydroxy) isocyanurate trimethylacrylate, triallyl terephthalate, diallyl maleate, diallyl fumarate, trivinyl trimellitate, divinyl adipate, diallyl succinate.

It is especially preferred, the crosslinking agent (CA) is a compound of formula (I)

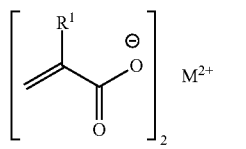

wherein $M^{2+}$ is a divalent metal ion and $R^1$ is hydrogen or methyl.

Preferably, $M^{2+}$ is selected from the group consisting of $Zn^{2+}$, $mg^{2+}$, $Ca^{2+}$, $Sr^{2+}$, $Ba^{2+}$, $Ni^{2+}$, $Co^{2+}$ and $Hg^{2+}$. It is especially preferred that $M^{2+}$ is $Zn^{2+}$.

Further, it is preferred that $R^1$ is hydrogen.

Accordingly, it is especially preferred that the crosslinking agent (CA) is zinc diacrylate.

In a first embodiment of the inventive process, the modified polypropylene composition (mPP) is obtained by extruding the polypropylene composition (PP) comprising the propylene polymer (PP1) and the plastomer (PL) in an extruder in the presence of the peroxide (PO) and the crosslinking agent (CA).

Optionally, said modified polypropylene composition (mPP) is subsequently (melt) blended with the inorganic filler (F) to obtain the final heterophasic polypropylene composition (HC).

In a second embodiment of the process, the polypropylene composition (PP) comprising the propylene polymer (PP1) and the plastomer (PL) and optionally the inorganic filler (F) are extruded in an extruder in the presence of the peroxide (PO) and the crosslinking agent (CA) to obtain the heterophasic polypropylene composition (HC).

The modification can be in particular effected by dosing the polypropylene composition (PP) or a mixture of the polypropylene composition (PP) and optionally the inorganic filler (F) into a twin screw extruder like Prism TSE24 40D with preferably a temperature profile 80/200/210/220/220/230/230/220/225/220° C. and a screw speed of 300 rpm. A masterbatch in a powder form consisting of the peroxide (PO), like 2,5-dimethyl-2,5-di-(tert-butylperoxy)hexane, the crosslinking agent (CA), like zinc diacrylate, and polypropylene is added directly into the extruder, achieving a concentration of 0.001 to 1.0 wt.-% of the peroxide (PO) and 0.05 to 3.0 wt.-% of the crosslinking agent (CA), based on the mixture. The polymer melt mixture is passed through the extruder, then to intensive devolatilisation, discharged and pelletized obtaining thereby the modified polypropylene composition (mPP) or the final heterophasic polypropylene composition (HC).

The properties of the propylene polymer (PP1) and the plastomer (PL) may change due to the use of the peroxide (PO) and the crosslinking agent (CA). This applies in particular for the intrinsic viscosity and the melt flow rate of the propylene polymer (PP1) and the plastomer (PL). In some cases the melt flow rate MFR (230° C., 2.16 kg) of the propylene polymer (PP1) might be enhanced due to the use of peroxide (PO).

In the following, the propylene polymer (PP1) and the plastomer (PL) are described in more detail.

The propylene polymer (PP1)

The propylene polymer (PP1) can be a propylene copolymer or a propylene homopolymer, the latter being preferred.

In case the propylene polymer (PP1) is a propylene copolymer, the propylene polymer (PP1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene polymer (PP1) according to this invention comprises, especially consists of, monomers copolymerizable with propylene from the group consisting of ethylene, 1-butene and 1-hexene. More specifically the propylene polymer (PP1) of this invention comprises—apart from propylene—units derivable from ethylene and/or 1-butene. In a preferred embodiment the propylene polymer (PP1) comprises units derivable from ethylene and propylene only.

The comonomer content of the propylene polymer (PP1) is in the range of 0.0 to 5.0 mol-%, yet more preferably in the range of 0.0 to 3.0 mol-%, still more preferably in the range of 0.0 to 1.0 mol-%.

It is especially preferred that the propylene polymer (PP1) is a propylene homopolymer (H-PP1).

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

It is preferred that the propylene polymer (PP1) is featured by a moderate melt flow rate. Accordingly, it is preferred that the propylene polymer (PP1) has a melt flow rate $MFR_2$ (230° C., 2.16 kg) determined according to ISO 1133 equal or below 35.0 g/10 min, more preferably in a range of 5.0 to 30.0 g/10 min, still more preferably in a range of 15.0 to 25.0 g/10 min, like in a range of 18.0 to 23.0 g/10 min.

Preferably the propylene polymer (PP1) is isotactic. Accordingly, it is preferred that the propylene polymer (PP1) has a rather high pentad concentration (mmmm %) i.e. more than 94.1%, more preferably more than 94.4%, like more than 94.4 to 98.5%, still more preferably at least 94.7%, like in the range of 94.7 to 97.5%.

A further characteristic of the propylene polymer (PP1) is the low amount of misinsertions of propylene within the polymer chain, which indicates that the propylene polymer (PP1) is produced in the presence of a Ziegler-Natta catalyst. Accordingly, the propylene polymer (PP1) is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the propylene polymer (PP1) is featured by rather low cold xylene soluble (XCS) content, i.e. by a xylene cold soluble (XCS) below 3.1 wt.-% Accordingly, the propylene polymer (PP1) has preferably a xylene cold soluble content (XCS) in the range of 1.0 to 3.0 wt.-%, more preferably in the range of 2.0 to 2.8 wt.-%, still more preferably in the range of 2.2 to 2.6 wt.-%.

Further, the propylene polymer (PP1) is preferably a crystalline propylene homopolymer. The term "crystalline" indicates that the propylene polymer (PP1) has a rather high melting temperature. Accordingly throughout the invention the propylene polymer (PP1) is regarded as crystalline unless otherwise indicated. Therefore, the propylene polymer (PP1) preferably has a melting temperature Tm measured by differential scanning calorimetry (DSC) of at least 160° C., more preferably at least 161° C., still more preferably at least 163° C., like in the range of 163° C. to 167° C.

Further it is preferred that the propylene polymer (PP1) has a crystallization temperature Tc measured by differential scanning calorimetry (DSC) of equal or more than 110° C., more preferably in the range of 110 to 132° C., more preferably in the range of 114 to 130° C.

The propylene polymer (PP1) is preferably featured by high stiffness. Accordingly the propylene polymer (PP1) preferably has a rather high flexural modulus. Accordingly it is preferred that the propylene polymer (PP1) has a flexural modulus according to ISO 178 of at least 1,500 MPa, more preferably in the range of 1,800 to 3,000 MPa, still more preferably in the range of 2,000 to 2,500 MPa.

Preferably, the propylene polymer (PP1) is obtained by polymerizing propylene in the presence of a Ziegler-Natta catalyst as defined below. More preferably, the propylene polymer (PP1) according to this invention is obtained by a process as defined in detail below by using the Ziegler-Natta catalyst.

The propylene polymer (PP1) can comprise, more preferably can consist of, two fractions, namely a first polypropylene fraction (PP1a) and a second polypropylene fraction (PP1b). Preferably the weight ratio between the first polypropylene fraction (PP1a) and the second polypropylene fraction (PP1b) [(PP1a):(PP1b)] is 70:30 to 40:60, more preferably 65:35 to 45:55.

The first polypropylene fraction (PP1a) and the second polypropylene fraction (PP1b) may differ in the melt flow rate. In particular, it is preferred that the melt flow rate MFR (230° C., 2.16 kg) of the first polypropylene fraction (PP1a) is lower than the melt flow rate MFR (230° C., 2.16 kg) of the second polypropylene fraction (PP1b).

Preferably, the first polypropylene fraction (PP1a) has a melt flow rate MFR (230° C., 2.16 kg) determined according to ISO 1133 in the range of 5.0 to 20.0 g/10 min, more preferably in the range of 7.0 to 15.0 g/10 min, still more preferably in the range of 8.0 to 12.0 g/10 min.

Further, it is preferred that the second polypropylene fraction (PP1b) has a melt flow rate MFR (230° C., 2.16 kg) determined according to ISO 1133 in the range of 30.0 to 65.0 g/10 min, more preferably in the range of 40.0 to 60.0 g/10 min, more preferably in the range of 45.0 to 55.0 g/10 min.

The propylene polymer (PP1) of the present invention may comprise further components. However, it is preferred that the inventive propylene polymer (PP1) comprises as polymer components only the propylene polymer (PP1) as defined in the instant invention. Accordingly, the amount of propylene polymer (PP1) may not result in 100.0 wt.-% based on the total propylene polymer (PP1). Thus, the remaining part up to 100.0 wt.-% may be accomplished by further additives known in the art. However, this remaining part shall be not more than 5.0 wt.-%, like not more than 3.0 wt.-% within the total propylene polymer (PP1). For instance, the inventive propylene polymer (PP1) may comprise additionally small amounts of additives selected from the group consisting of antioxidants, stabilizers, inorganic fillers, colorants, nucleating agents and antistatic agents. In general, they are incorporated during granulation of the pulverulent product obtained in the polymerization. Accordingly, the propylene polymer (PP1) constitutes at least to 95.0 wt.-%, more preferably at least 97.0 wt.-% to the total propylene polymer (PP1).

In case the propylene polymer (PP1) comprises an α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl)phosphate or aluminum-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the propylene polymer (PP1), contains up to 5.0 wt.-% of the α-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl)phosphate, vinylcycloalkane polymer, vinylalkane polymer, and mixtures thereof.

The propylene polymer (PP1) according to this invention is preferably produced in the presence of
(a) a Ziegler-Natta catalyst comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

Preferably, the propylene polymer (PP1) is produced in a sequential polymerization process as further described below comprising at least two reactors (R1) and (R2), in the first reactor (R1) the first polypropylene fraction (PP1a) is produced and subsequently transferred into the second reactor (R2), in the second reactor (R2) the second polypropylene fraction (PP1b) is produced in the presence of the first polypropylene fraction (PP1a).

The process for the preparation of the propylene homopolymer as well as the Ziegler-Natta catalyst are further described in detail below.

As already indicated above, the propylene polymer (PP1) is preferably produced in a sequential polymerization process.

The term "sequential polymerization system" indicates that the propylene polymer (PP1), is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR). Accordingly, the average concentration of the first fraction ($1^{st}$ F) of the propylene polymer (PP1), i.e. the first polypropylene fraction (PP1a), in the polymer slurry within the loop reactor (LR) is typically from 15 wt.-% to 55 wt.-%, based on the total weight of the polymer slurry within the loop reactor (LR). In one preferred embodiment of the present invention the average concentration of the first polypropylene fraction (PP1a) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first polypropylene fraction (PP1a), more preferably the polymer slurry of the loop reactor (LR) containing the first polypropylene fraction (PP1a), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first polypropylene fraction (PP1a), is led directly to the next stage gas phase reactor.

Alternatively, the propylene homopolymer of the first polymerization reactor (R1), i.e. the first polypropylene fraction (PP1a), more preferably polymer slurry of the loop reactor (LR) containing the first polypropylene fraction (PP1a), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

The Ziegler-Natta catalyst is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst is fed in the pre-polymerization reactor. Subsequently the pre-polymerization product containing the Ziegler-Natta catalyst is transferred into the first polymerization reactor (R1).

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and optional in the third reactor (R3) is in the range of 62 to 95° C., more preferably in the range of 67 to 92° C.

Preferably the operating temperature in the second polymerization reactor (R2) is equal to or higher than the operating temperature in the first polymerization reactor (R1). Accordingly it is preferred that the operating temperature (a) in the first polymerization reactor (R1) is in the range of 62 to 85° C., more preferably in the range of 65 to 82° C., still more preferably in the range of 67 to 80° C., like 70 to 80° C.;
and
(b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor)($Q°$ (i.e. $V_R/Q_o$), i.e $\tau=V_R/Q_o$ [tau=$V_R/Q_o$]. In case of a loop reactor the reaction volume ($V_R$) equals to the reactor volume.

As mentioned above the preparation of the propylene homopolymer can comprise in addition to the (main) polymerization of the propylene homopolymer in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst. According to this embodiment the Ziegler-Natta catalyst, the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst, the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 35° C.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst and the polypropylene (Pre-PP) produced in the pre-polymerization reactor (PR) is obtained. Preferably the Ziegler-Natta catalyst is (finely) dispersed in the polypropylene (Pre-PP). In other words, the Ziegler-Natta catalyst particles introduced in the pre-polymerization reactor (PR) split into smaller fragments which are evenly distributed within the growing polypropylene (Pre-PP). The sizes of the introduced Ziegler-Natta catalyst particles as well as of the obtained fragments are not of essential relevance for the instant invention and within the skilled knowledge.

In case that pre-polymerization is not used, propylene and the other ingredients such as the Ziegler-Natta catalyst are directly introduced into the first polymerization reactor (R1).

Accordingly, the propylene homopolymer is preferably produced in a process comprising the following steps under the conditions set out above (a) in the first polymerization reactor (R1), i.e. in a loop reactor (LR), propylene is polymerized obtaining a first polypropylene fraction (PP1a) of the propylene polymer (PP1),
(b) transferring said first polypropylene fraction (PP1a) to a second polymerization reactor (R2),
(c) in the second polymerization reactor (R2) propylene is polymerized in the presence of the first polypropylene fraction (PP1a) obtaining a second polypropylene fraction (PP1b) of the propylene homopolymer, said first polypropylene fraction (PP1a) and said second polypropylene fraction (PP1b) form the propylene polymer (PP1).

A pre-polymerization as described above can be accomplished prior to step (a).

According to the invention the propylene polymer (PP1) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the propylene polymer (PP1) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

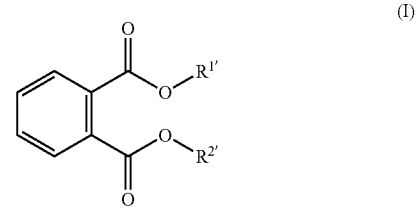

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanized carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

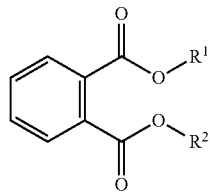
(II)

with $R^1$ and $R^2$ being methyl or ethyl, preferably ethyl, the dialkylphthalate of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanized carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene polymer (PP1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminum, like triethylaluminum (TEA), dialkyl aluminum chloride and alkyl aluminum sesquichloride.

Component (iii) of the catalysts system used is an external donor represented by formula (IIIa) or (IIIb). Formula (IIIa) is defined by

$$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

$$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [Si(OCH$_3$)$_2$(cyclo-pentyl)$_2$], diisopropyl dimethoxy silane [Si(OCH$_3$)$_2$(CH (CH$_3$)$_2$)$_2$].

Most preferably the external donor is dicyclopentyl dimethoxy silane [Si(OCH$_3$)$_2$(cyclo-pentyl)$_2$](donor D).

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

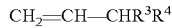

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the propylene polymer (PP1) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Plastomer (PL)

The plastomer (PL) can be any elastomeric polyolefin with the proviso that it chemically differs from the elastomeric ethylene/propylene copolymer (EPR) as defined herein. More preferably the plastomer (PL) is a very low density polyolefin, more preferably a very low density polyolefin polymerized using single site, preferably metallocene catalysis. Typically, the plastomer (PL) is an ethylene copolymer.

As mentioned above, the properties of the plastomer (PL) change due to the use of the peroxide (PO) and the cross-linking agent (CA). That is the properties defined in this section may differ after the plastomer (PL) has been treated with the peroxide (PO). In particular the density as well as the melt flow rate MFR2 (190° C., 2.16 kg) is affected. However the comonomer content is not affected.

In a preferred embodiment, the plastomer (PL) has a density below 0.880 g/cm$^3$. More preferably, the density of the plastomer (PL) is equal or below 0.870 g/cm$^3$, still more preferably in the range of 0.845 to 0.865 g/cm$^3$, like in the range of 0.855 to 0.862 g/cm$^3$.

Preferably, the plastomer (PL) has a melt flow rate MFR$_2$ (190° C., 2.16 kg) determined according to ISO 1133 below 30 g/10 min, more preferably from 0.1 to 15 g/10 min, still more preferably from 0.1 to 10 g/10 min, like a range from 0.1 to 5.0 g/10 min.

Preferably, the plastomer (PL) comprises units derived from ethylene and a C4 to C20 α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene.

In an especially preferred embodiment, the plastomer (PL) consists of units derivable from (i) ethylene and (ii) 1-butene or 1-octene.

The comonomer content, like the C4 to C20 α-olefin content, of the plastomer (PL) is in the range of 8 to 30 mol-%, more preferably in the range of 10 to 25 mol-%, still more preferably in the range of 11 to 23 mol-%, like in the range of 12 to 20 mol-%.

In one preferred embodiment the elastomer (E) is prepared with at least one metallocene catalyst. The elastomer (E) may also be prepared with more than one metallocene catalyst or may be a blend of multiple elastomers prepared with different metallocene catalysts. In some embodiments, the elastomer (E) is a substantially linear ethylene polymer (SLEP). SLEPs and other metallocene catalysed elastomers (E) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

The Inorganic Filler (F)

A further optional requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size (D$_{50}$) in the range of 0.8 to 20 μm and a top cut particle size (D$_{95}$) in the range of 10 to 20 μm, preferably a median particle size (D$_{50}$) in the range of 5.0 to 8.0 μm and top cut particle size (D$_{95}$) in the range of 12 to 17 μm, more preferably a median particle size (D$_{50}$) in the range of 5.5 to 7.8 μm and top cut particle size (D$_{95}$) of 13 to 16.5 μm.

According to this invention the filler (F) does not belong to the class of alpha nucleating agents (NU) and additives (AD).

The filler (F) is state of the art and a commercially available product.

The Additives (AD)

In addition to the modified polypropylene composition (mPP) and the optional inorganic filler (F) the heterophasic polypropylene composition (HC) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the heterophasic polypropylene composition (HC) of the invention does not comprise (a) further polymer (s) different to modified polypropylene composition (mPP), i.e. different to the propylene polymer (PP1) and the plastomer (PL), in an amount exceeding 15 wt.-%, preferably in an amount exceeding 10 wt.-%, more preferably in an amount exceeding 9 wt.-%, based on the weight of the heterophasic polypropylene composition (HC). If an additional polymer is present, such a polymer is typically a polymeric carrier material for the peroxide (PO), the crosslinking agent (CA) and the additives (AD). Any carrier material for additives (AD) is not calculated to the amount of polymeric compounds as indicated in the present invention, but to the amount of the respective additive. Accordingly in the present invention it is distinguished between the polymeric carrier material of the peroxide (PO) and the additives (AD). As mentioned above, the polymeric carrier materials of the peroxide (PO) and the crosslinking agent (CA) are considered separately, whereas the polymeric carrier material of the additives (AD) is regarded as part of said additives (AD).

The polymeric carrier material of the additives (AD) is a carrier polymer to ensure a uniform distribution in the heterophasic polypropylene composition (HC) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The heterophasic polypropylene composition (HC) of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive heterophasic polypropylene composition (HC). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive heterophasic polypropylene composition (HC).

The Use

The present invention is also directed to the use of a composition comprising a peroxide (PO) and a crosslinking agent (CA) to reduce tigerskin of a polypropylene composition (PP) wherein a heterophasic polypropylene composition (HC) is obtained, said heterophasic polypropylene composition (HC) comprising a modified polypropylene composition (mPP). Concerning the definition of the heterophasic polypropylene composition (HC), the modified polypropylene composition (mPP) and the polypropylene composition (PP), reference is made to the information provided above.

The reduction of tigerskin is preferably accomplished in case of MSE values equal or below 10, more preferably in the range of 1 to 10, yet more preferably in the range of 1 to 5 for the heterophasic polypropylene composition (HC).

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Polymer Microstructure by NMR Spectroscopy

Quantitative nuclear-magnetic resonance (NMR) spectroscopy was used to quantify the comonomer content of the polymers. Quantitative $^{13}C$ {$^1H$}NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C$ {$^1H$}NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^1H$}spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(5\beta\beta+5\beta\gamma+5\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of melt flow rate $MFR_2$ (230° C.) of the second polypropylene fraction (PP1b), i.e. the polymer fraction produced in the second reactor (R2), of the propylene polymer (PP1):

$$MFR(PP1b) = 10^{\left[\frac{\log(MFR(PP1))-w(PP1a)\times\log(MFR(PP1a))}{w(PP1b)}\right]}$$

wherein w(PP1a) is the weight fraction [in wt.-%] of the first propylene polymer fraction, i.e. the polymer produced in the first reactor (R1), w(PP1b) is the weight fraction [in wt.-%] of the first second propylene polymer fraction, i.e. the polymer produced in the second reactor (R2), MFR(PP1a) is the melt flow rate $MFR_2$ (230° C.) [in g/10 min] of the first propylene polymer fraction, i.e. the polymer produced in the first reactor (R1), MFR(PP1) is the melt flow rate $MFR_2$ (230° C.) [in g/10 min] of the first and second propylene polymer fractions, i.e. the polymer produced in the first and second reactor (R1+R2), MFR(PP1b) is the calculated melt flow rate $MFR_2$ (230° C.) [in g/10 min] of the second propylene polymer fraction, i.e. the polymer produced in the second reactor (R2).

Quantification of Comonomer Content in Plastomer by NMR Spectroscopy

Quantitative nuclear-magnetic resonance (NMR) spectroscopy was used to quantify the comonomer content of the polymers. Quantitative $^{13}$C {$^1$H}NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification [Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373]. Standard single-pulse excitation was employed utilising the transient NOE at short recycle delays of 3s [Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382] and the RS-HEPT decoupling scheme[Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198]. A total of 1024 (1 k) transients were acquired per spectrum. This setup was chosen due its high sensitivity towards low comonomer contents. Quantitative $^{13}$C {$^1$H}NMR spectra were processed, integrated and quantitative properties determined using custom spectral analysis automation programs. All chemical shifts are internally referenced to the bulk methylene signal (δ+) at 30.00 ppm [J. Randall, Macromol. Sci., Rev. Macromol. Chem. Phys. 1989, C29, 201].

Characteristic signals corresponding to the incorporation of comonomers were observed [J. Randall, Macromol. Sci., Rev. Macromol. Chem. Phys. 1989, C29, 201] and all contents calculated with respect to all other monomers present in the polymer.

[For further information see Zhou, Z., Kuemmerle, R., Qiu, X., Redwine, D., Cong, R., Taha, A., Baugh, D. Winniford, B., J. Magn. Reson. 187 (2007) 225 and Busico, V., Carbonniere, P., Cipullo, R., Pellecchia, R., Severn, J., Talarico, G., Macromol. Rapid Commun. 2007, 28, 1128]

Comonomer content in plastomer (PL) was measured in a known manner based on Fourier transform infrared spectroscopy (FTIR) calibrated with $^{13}$C-NMR, using Nicolet Magna 550 IR spectrometer together with Nicolet Omnic FTIR software. Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^1$ through the minimum points and the long base line about between 1410 and 1220 cm$^1$. Calibrations need to be done specifically for each base line type. Also, the comonomer content of the unknown sample needs to be within the range of the comonomer contents of the calibration samples.

$MFR_2$ (230° C.) is measured according to ISO 1133 (230° C., 2.16 kg load).

$MFR_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01. The part which remains insoluble is the xylene cold insoluble (XCI) fraction.

The xylene hot insolubles (XHU, wt.-%): The gel content is assumed to be identical to the xylene hot insoluble (XHU) fraction, which is determined by extracting 1 g of finely cut polymer sample with 350 ml xylene in a Soxhlet extractor for 5 hours at the boiling temperature. The remaining solid amount is dried at 90° C. and weighed for determining the insolubles amount.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

Flexural Test: The flexural modulus and flexural strength were determined in 3-point-bending according to ISO 178 on injection molded specimens of 80×10×4 mm prepared in accordance with ISO 294-1:1996.

Charpy notched impact strength is determined according to ISO 180/1A at 23° C. by using injection moulded test specimens as described in EN ISO 1873-2 (80×10×4 mm).

Shrinkage: The shrinkage is determined on centre gated, injection moulded circular disks (diameter 180 mm, thickness 3 mm, having a flow angle of 355° and a cut out of 5°). Two specimens are moulded applying two different holding pressure times (10s and 20s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system. A schematic setup is given in Figure 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a filmgate of 1.4 mm were used and were produced with different filling times of 1.5, 3 and 6 sec respectively.

Further conditions:
Melt temperature: 240° C.
Mould temperature 30° C.
Dynamic pressure: 10 bar hydraulic The smaller the MSE value is at a certain filling time, the smaller is the tendency for flow marks.

The glass transition temperature Tg and the storage modulus G'(23° C.) are determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

2. Examples

Preparation of PP1
Preparation of the Catalyst

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst). 35 ml of mineral oil (Paraffinum Liquidum PL68) was added to a 125 ml stainless steel reactor followed by 0.82 g of triethyl aluminum (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 1

Polymerization of PP1

|  |  | PP1 |
| --- | --- | --- |
| Prepoly |  |  |
| Residence time | [h] | 0.38 |
| Temperature | [° C.] | 30 |
| Co/ED ratio | [mol/mol] | 11 |
| Co/TC ratio | [mol/mol] | 180 |
| Loop (R1) |  |  |
| Residence time | [h] | 0.35 |
| Temperature | [° C.] | 80 |
| H$_2$/C$_3$ ratio | [mol/kmol] | 5 |
| Split | [%] | 60 |
| MFR | [g/10 min] | 10 |
| XCS | [wt %] | 1.0 |
| 1$^{st}$ GPR (R2) |  |  |
| Residence time | [h] | 1.5 |
| Temperature | [° C.] | 80 |
| Pressure | [bar] | 24 |
| H$_2$/C$_3$ ratio | [mol/kmol] | 140 |
| Split | [%] | 40 |
| MFR | [g/10 min] | 20 |
| XCS | [wt %] | 2.0 |

The PP1 powder was stabilized in a twin-screw extruder with a standard additive packing including 0.4 wt.-% Talc (Talc HM 2 by IMI), 0.1 wt % Irganox B 215 FF, and 0.07 wt % calcium stearate supplied by Croda.

Preparation of the Modified Polypropylene Composition (mPP)

Example CE1 (Comparative)

60.0 wt.-% of PP1 and 40.0 wt.-% of the ethylene-butene copolymer Engage HM 7487 by Dow were melt blended on a co-rotating twin screw extruder. The polymer melt mixture was discharged and pelletized.

Example CE2 (Comparative)

To a mixture of 58.0 wt.-% of PP1 and 40.0 wt.-% of the ethylene-butene copolymer Engage HM 7487 by Dow, 2.0 wt.-% of a masterbatch of 5 wt.-% 2,5-dimethyl-2,5-di-(tert-butylperoxy)hexane with polypropylene, were dosed in the main hopper of a twin screw extruder ZSK 18 (screw length 40 D) with a temperature profile 20/190/220/225/230/230/210/200° C. and a screw speed of 300 rpm. The polymer melt mixture was discharged and pelletized.

Example CE3 (Comparative)

To a mixture of 57.0 wt.-% of PP1 and 40.0 wt.-% of the ethylene-butene copolymer Engage HM 7487 by Dow, 3.0 wt.-% of a masterbatch of 5 wt.-% 2,5-dimethyl-2,5-di-(tert-butylperoxy)hexane with polypropylene, were dosed in the main hopper of a twin screw extruder ZSK 18 (screw length 40 D) with a temperature profile 20/190/220/225/230/230/210/200° C. and a screw speed of 300 rpm. The polymer melt mixture was discharged and pelletized.

Example CE4 (Comparative)

To a mixture of 56.0 wt.-% of PP1 and 40.0 wt.-% of the ethylene-butene copolymer Engage HM 7487 by Dow, 4.0 wt.-% of a masterbatch of 5 wt.-% 2,5-dimethyl-2,5-di-(tert-butylperoxy)hexane with polypropylene, were dosed in the main hopper of a twin screw extruder ZSK 18 (screw length 40 D) with a temperature profile 20/190/220/225/230/230/210/200° C. and a screw speed of 300 rpm. The polymer melt mixture was discharged and pelletized.

Example 1E4 (Inventive)

To a mixture of 48.0 wt.-% of PP1 and 40.0 wt.-% of the ethylene-butene copolymer Engage HM 7487 by Dow, 2.0 wt.-% of a masterbatch of 5 wt.-% 2,5-dimethyl-2,5-di-(tert-butylperoxy)hexane with polypropylene, 2.0 wt.-% of zinc diacrylate (Dymalink 633 by Total Cray Valley) and 8.0 wt.-% of a propylene homopolymer (HC001), were dosed in the main hopper of a twin screw extruder ZSK 18 (screw length 40 D) with a temperature profile 20/190/220/225/230/230/210/200° C. and a screw speed of 300 rpm. The polymer melt mixture was discharged and pelletized.

TABLE 2

Compositions and properties of the comparative and inventive examples of the modified polypropylene composition (mPP)

|  |  | CE1 | CE2 | CE3 | CE4 | IE1 |
|---|---|---|---|---|---|---|
| PP1 | [wt.-%] | 60 | 58 | 57 | 56 | 48 |
| PP2 | [wt.-%] | 0 | 0 | 0 | 0 | 8 |
| PL | [wt.-%] | 40 | 40 | 40 | 40 | 40 |
| POX PP | [wt.-%] | 0 | 2 | 3 | 4 | 2 |
| CA | [wt.-%] | 0 | 0 | 0 | 0 | 2 |
| MFR | [g/10 min] | 7.0 | 28.9 | 34.5 | 38.5 | 10.4 |
| Flexural modulus | [MPa] | 1016 | 759 | 730 | 686 | 631 |
| Flexural strength | [MPa] | 21.8 | 16.9 | 16.4 | 15.3 | 13.9 |
| Charpy notched impact strength (+23° C.) | [kJ/m$^2$] | 64.8 | 8.7 | 10.2 | 8.6 | 62.9 |
| Charpy notched impact strength (−20° C.) | kJ/m$^2$] | 12.4 | 6.6 | 8.2 | 7.4 | nd |
| Mould average shrinkage | [%] | 1.25 | 1.76 | 1.81 | 1.83 | nd |
| MSE | [—] | 225 | 6.0 | 2.4 | 6.5 | 3.2 |
| XCS | [wt.-%] | 41.1 | 40.4 | 40.2 | 40.1 | 21.7 |
| XHU | [wt.-%] | 0.01 | 0.04 | 0.04 | 0.05 | 18.01 |
| IV(XCS) | [dl/g] | 2.03 | 1.74 | 1.76 | 1.77 | 1.45 |
| IV(XCI) | [dl/g] | 1.70 | 1.07 | 0.91 | 0.93 | 0.76 |
| IV(XCS)/IV(XCI) | [—] | 1.19 | 1.62 | 1.93 | 1.90 | 1.90 |
| DMTA tanδ | [° C.] | −58.1 | −56.0 | −56.0 | −56.0 | −56.1 |
| G'(23° C.) DMTA | [MPa] | 419 | 322 | 314 | 288 | 245 |

PP2 is a polypropylene homopolymer for general purpose injection moulding, free of slip and antiblock agents and without calcium stearate, comprising 500 ppm precipitated calcium carbonate (Socal U1S1, distributed by Solvay Chemicals) as particulate acid scavenger, with MFR (230° C./2.16 kg) of 2.0 g/10 min and a density of 905 kg/m$^3$.

PL is the commercial ethylene-butene copolymer Engage HM 7487 by Dow having a density of 0.860 g/cm$^3$, a melt flow rate MFR$_2$ (190° C., 2.16 kg) of 2.0 g/10 min and a 1-butene content of 19.1 mol-%.

PDX PP is a masterbatch of 5 wt.-% 2,5-dimethyl-2,5-di-(tert-butylperoxy)hexane with polypropylene.

CA is the zinc diacrylate Dymalink 633 by Total Cray Valley

The invention claimed is:

1. A heterophasic polypropylene composition (HC) comprising a modified polypropylene composition (mPP), wherein said modified polypropylene composition (mPP) is obtained by treatment of a polypropylene composition (PP) with a peroxide (PO) and a crosslinking agent (CA), said polypropylene composition (PP) comprising:
   i) a propylene polymer (PP1), and
   ii) a plastomer (PL) being a copolymer of ethylene and at least one C4 to C20 α-olefin, wherein;
said heterophasic polypropylene composition (HC) has a ratio XCS/XHU in the range of 0.6 to 2.6, wherein XCS is the xylene cold soluble content [in wt. %] of the heterophasic polypropylene composition (HC) and XHU is the xylene hot insoluble content [in wt. %] of the heterophasic polypropylene composition (HC),
and wherein
the weight ratio of the propylene polymer (PP1) and the plastomer (PL) [w(PP1)/w(PL)] in the modified polypropylene composition (mPP) is from above 1.0 to 3.0, wherein w(PP1) is the overall amount of the propylene polymer (PP1) (in wt. %) within the modified polypropylene composition (mPP) and w(PL) is the overall amount of the plastomer (PL) (in wt. %) within the modified polypropylene composition (mPP).

2. The heterophasic polypropylene composition (HC) according to claim 1, having a xylene hot insoluble content (XHU) in the range of 11.0 to 25.0 wt. %.

3. The heterophasic polypropylene composition (HC) according to claim 1, having a xylene cold soluble content (XCS) determined according ISO 16152 equal or below 29.0 wt. %.

4. The heterophasic polypropylene composition (HC) according to claim 1, having a melt flow rate $MFR_2$ (230° C., 2.16 kg) determined according to ISO 1133 of at least 10.0 g/10 min.

5. The heterophasic polypropylene composition (HC) according to claim 1, wherein the weight ratio of the propylene polymer (PP1) and the plastomer (PL) [w(PP1)/w(PL)] in the modified polypropylene composition (mPP) is from 1.1 to 1.8.

6. The heterophasic polypropylene composition (HC) according to claim 1, wherein the polypropylene composition (PP) comprises:
i) at least 10.0 wt. % of the propylene polymer (PP1), and
ii) at least 5.0 wt. % of the plastomer (PL),
based on the overall amount of the polypropylene composition (PP).

7. The heterophasic polypropylene composition (HC) according to claim 1, wherein the propylene polymer (PP1)
i) is a propylene homopolymer (H-PP1), and/or
ii) has a melt flow rate $MFR_2$ (230° C., 2.16 kg) determined according to ISO 1133 equal or below 35.0 g/10 min.

8. The heterophasic polypropylene composition (HC) according to claim 1, wherein the propylene polymer (PP1) has:
i) a first polypropylene fraction (PP1a) having a melt flow rate $MFR_2$ (230° C., 2.16 kg) determined according to ISO 1133 in the range of 5.0 to 20.0 g/10 min and
ii) a second polypropylene fraction (PP1b) having a melt flow rate $MFR_2$ (230° C., 2.16 kg) determined according to ISO 1133 in the range of 30.0 to 65.0 g/10 min.

9. The heterophasic polypropylene composition (HC) according to claim 1, wherein the plastomer (PL) is a copolymer of ethylene and 1-butene or 1-octene.

10. The heterophasic polypropylene composition (HC) according to claim 1, wherein the plastomer (PL) has:
(a) a melt flow rate MFR (190° C., 2.16 kg) measured according to ISO 1133 below 30 g/10 min,
(b) a comonomer content, based on the total weight of the plastomer (PL), in the range of 8.0 to 35.0 mol %, and
(c) a density below 0.880 g/cm$^3$.

11. The heterophasic polypropylene composition (HC) according to claim 1, wherein the peroxide (PO) is an alkyl or aryl peroxide.

12. The heterophasic polypropylene composition (HC) according to claim 1, wherein the crosslinking agent is a compound of formula (I):

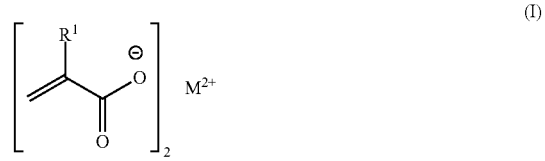

wherein $M^{2+}$ is a divalent metal ion and $R^1$ is hydrogen or methyl.

13. A moulded article, comprising the heterophasic polypropylene composition (HC) according to claim 1.

14. A process for the preparation of the heterophasic composition (HC) according to claim 12, wherein the polypropylene composition (PP) comprising the propylene polymer (PP1), the plastomer (PL) and optionally the propylene homopolymer (H-PP) is extruded in an extruder in the presence of the peroxide (PO) and the crosslinker (CA).

* * * * *